(12) United States Patent
Ishii et al.

(10) Patent No.: US 8,406,199 B2
(45) Date of Patent: *Mar. 26, 2013

(54) DATA FLOW AMOUNT CONTROL DEVICE AND DATA FLOW AMOUNT CONTROL METHOD

(75) Inventors: Hiroyuki Ishii, Yokosuka (JP); Koji Furutani, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 237 days.

This patent is subject to a terminal disclaimer.

(21) Appl. No.: 11/857,833

(22) Filed: Sep. 19, 2007

(65) Prior Publication Data

US 2008/0068999 A1  Mar. 20, 2008

(30) Foreign Application Priority Data

Sep. 19, 2006 (JP) ................................ P2006-253125

(51) Int. Cl.
  *H04J 3/22* (2006.01)
(52) U.S. Cl. ............... 370/332; 455/452.1; 455/453
(58) Field of Classification Search .......... 370/310–350; 455/436–444, 452.1, 452.2, 453
  See application file for complete search history.

(56) References Cited

U.S. PATENT DOCUMENTS

| | | | | |
|---|---|---|---|---|
| 6,072,784 A * | 6/2000 | Agrawal et al. | ............... | 370/311 |
| 6,263,203 B1 * | 7/2001 | Jahn | ............... | 455/436 |
| 6,985,439 B2 * | 1/2006 | Hosein | ............... | 370/230 |
| 7,003,302 B2 * | 2/2006 | Yoshida et al. | ............... | 455/450 |
| 2004/0071108 A1 | 4/2004 | Wigell et al. | | |
| 2006/0120321 A1 * | 6/2006 | Gerkis et al. | ............... | 370/329 |
| 2006/0165028 A1 * | 7/2006 | Hiraki et al. | ............... | 370/328 |
| 2007/0081554 A1 * | 4/2007 | Saffre | ............... | 370/468 |
| 2008/0049618 A1 * | 2/2008 | Ishii et al. | ............... | 370/235 |

(Continued)

FOREIGN PATENT DOCUMENTS

| | | |
|---|---|---|
| EP | 1 507 423 A1 | 2/2005 |
| GB | 2 361 392 A | 10/2001 |

(Continued)

OTHER PUBLICATIONS

"3$^{rd}$ Generation Partnership Project; Technical Specification Group Radio Access Network; Physical layer aspects of UTRA High Speed Downlink Packet Access (Release 4)", 3GPP TR 25.848 v4.0.0, Technical Report, Mar. 2001, pp. 1-89.

(Continued)

*Primary Examiner* — Mark Rinehart
*Assistant Examiner* — Matthew Hopkins
(74) *Attorney, Agent, or Firm* — Oblon, Spivak, McClelland, Maier & Neustadt, L.L.P.

(57) ABSTRACT

A data flow amount control device in a mobile communication system which includes a plurality of mobile stations, a control station relaying packets addressed to each of the plurality of mobile stations, and a base station temporarily storing the packets transmitted from the control station in a buffer and transmitting the packets to each of the plurality of mobile stations. The data flow amount control device comprises a determination unit configured to determine an initial value of an amount of packets which are addressed to a mobile station newly starting a communication in the mobile communication system and are transmitted from the control station to the base station, according to the number of mobile stations which are performing the communication in the mobile communication system.

14 Claims, 6 Drawing Sheets

U.S. PATENT DOCUMENTS

2008/0069046 A1    3/2008    Ishii et al.
2009/0059790 A1*  3/2009    Calvert et al. ................ 370/235

FOREIGN PATENT DOCUMENTS

| | | | |
|---|---|---|---|
| GB | 2361392 A | * | 10/2001 |
| JP | 2001-57627 | | 2/2001 |
| JP | 2002-77987 | | 3/2002 |
| JP | 2002-171572 | A | 6/2002 |
| JP | 2004-153619 | A | 5/2004 |
| JP | 2005-57323 | | 3/2005 |
| JP | 2005-524333 | | 8/2005 |
| JP | 2006-5422 | A | 1/2006 |
| WO | WO 03/094389 | A1 | 11/2003 |
| WO | WO 2005/109787 | A1 | 11/2005 |

OTHER PUBLICATIONS

"3$^{rd}$ Generation Partnership Project; Technical Specification Group Radio Access Network; UTRAN I$_{ub}$ Interface User Plane Protocols for Common Transport Channel data streams (Release 6)", 3GPP TS 25.435 v6.3.0, Technical Specification, Sep. 2005, pp. 1-43.

3$^{rd}$ Generation Partnership Project; Technical Specification Group Radio Access Network; UE Radio Access capabilities (Release 6), 3GPP TS 25.306 v6.8.0, Technical Specification, Mar. 2006, pp. 1-33.

3$^{rd}$ Generation Partnership Project; Technical Specification Group Radio Access Network; UTRAN I$_{ub}$ Interface Node B Application Part (NBAP) signallingg (Release 6), 3GPP TS 25.433 v6.9.0 Technical Specification, Mar. 2006, pp. 1-755.

"3$^{rd}$ Generation Partnership Project 2; cdma2000 High Rate Packet Data Air Interface Specification", 3GPP2 C.S0024-A Version 1.0, Mar. 2004, pp. 1-1083.

Office Action issued Aug. 12, 2010, in European Patent Application No. 07 018 376.9-2416.

Japanese Office Action issued on Feb. 22, 2011 in corresponding Japanese Application No. 2006-253125 (with an English Translation).

* cited by examiner

DATA FLOW AMOUNT CONTROL DEVICE AND DATA FLOW AMOUNT CONTROL METHOD

CROSS REFERENCE TO RELATED APPLICATION

This application is based upon and claims the benefit of priority from prior Japanese Patent Application P2006-253125 filed on Sep. 19, 2006; the entire contents of which are incorporated by reference herein.

BACKGROUND OF THE INVENTION

1. Field of the Invention

The present invention relates to a data flow amount control device and a data flow amount control method.

2. Description of the Related Art

Figure 1:
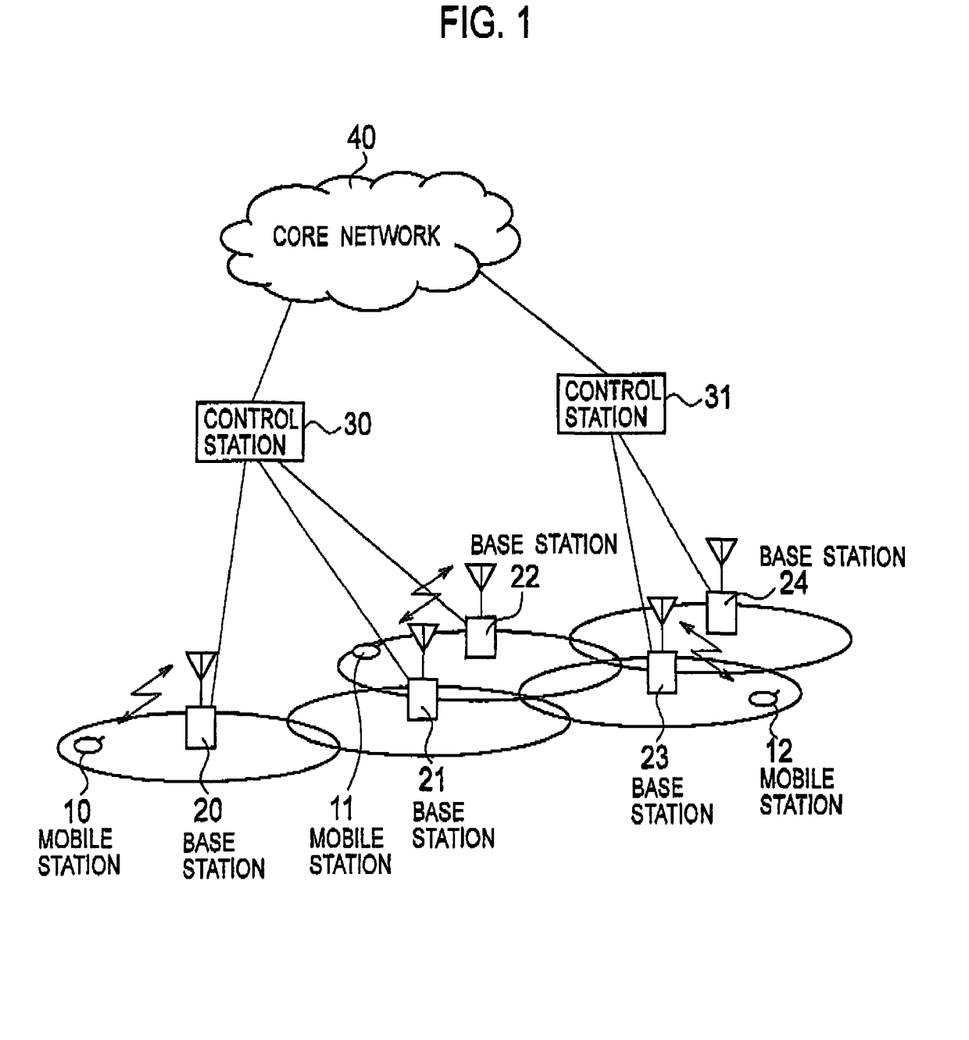
FIG. 1 is an entire configuration of a mobile communication system of a present embodiment.

In mobile communication systems such as cellular phones which have been widely used, entire service area is divided into a plurality of radio zones which are referred to as cells and services are provided in the cells. As shown in FIG. 1, such a mobile communication system includes a plurality of base stations covering the cells, a plurality of mobile stations which perform communications by setting radio channels between the mobile stations and the base stations, and control stations which control the plurality of base stations and the plurality of mobile stations. Further, the control stations are connected to a core network including an exchange and the like.

In such a configuration, signal transmission in the communications between the core network and the mobile station is performed through the control station and the base station. Thus, a base station performs relaying between a wired section and a radio section, the wired section being established between a core network and a base station via a control station, and the radio section being established between a base station and a mobile station. The base station has a function of temporarily buffering a signal transmitted from the core network and control station. An object of the buffering function is to buffer a signal from the wired section when a transmission rate in the wired section is greater than that in the radio section.

Meanwhile, a high speed downlink packet transmission, which is of high-speed and large-volume, such as High Speed Downlink Packet Access (HSDPA) or 1x EV-DO is standardized, and also has been developed (for example, 3GPP TR25.848 v4.0.0 and 3GPP2 C. s0024 Rev. 1.0.0).

A main characteristic of such a high speed packet transmission scheme is to utilize an adaptive modulation and coding scheme in which packet transmission formats are adaptively changed according to radio conditions of a mobile station which performs a packet transmission. Here, in such a high speed packet transmission scheme, the packet transmission formats are a data size, a modulation scheme, the number of codes, a coding rate of packets and the like.

In this adaptive modulation and coding scheme, a radio transmission data rate changes with time according to a radio condition of a mobile station. For example, in the HSDPA, the data size of a packet, a modulation scheme, and the number of codes are controlled according to a radio condition between a mobile station and a base station, whereby an adaptive modulation and coding is performed.

In addition, by use of the adaptive modulation and coding scheme in above HSDPA and 1x EV-DO, packets are transmitted through a radio section in such a transmission format that an error rate of the packets would be a predetermined value. However, the actual error rate varies according to a propagation environment of the radio section including, for example, a moving speed of the mobile station, the number of paths and the number of base stations performing communications at the same time. For example, in the case of HSDPA, packets are transmitted through the radio section in a transmission format having an error rate of 10%. However, the actual error rate is 10% to 40%. Thus, the radio transmission data rate changes from time to time according to the error rate in the radio section.

By the way, in a case of the mobile communication system configured as described above, when the transmission data rate of the wired section is larger than that of the radio section, packets tend to be stored in a temporal buffer of a relaying base station; and, when the transmission data rate of the wired section is smaller than that of the radio section, packets tend to be exhausted in the temporal buffer of the relaying base station.

Due to the limitation of the amount of the packets stored in the temporal buffer of the relaying base station, the packets overflowed from the temporal buffer are deleted. In addition, due to the exhaustion of the packets stored in the buffer of the relaying base station, an entire radio bandwidth cannot be always used up.

Accordingly, when there is a difference between a transmission data rate in a radio section and a transmission data rate in a wired section, a transmission efficiency is more likely to deteriorate due to the deletion of packets caused by a buffer overflow, or an utilization efficiency of a radio transmission bandwidth is more likely to deteriorate due to the exhaustion of the buffer.

In order to avoid the above two problems, it is necessary to control the transmission data rate in the radio section and the transmission data rate in the wired section so that these transmission data rates can be made as equal as possible.

From the viewpoint of suppressing the deletion of packets in the base station in communications between the core network and the mobile station, a method has been proposed in which a data flow amount control for controlling an amount of packets transmitted from a control station to a base station is performed according to an amount of packets stored in the buffer of the base station (Japanese Patent Application Laid-open Publication No. 2002-077987).

Moreover, another method (Japanese Patent Application Laid-open Publication No. 2005-057323) has been also proposed for such a communication system in which a radio transmission data rate greatly changes like a high speed packet communication scheme, and this method makes it possible to prevent the deterioration of the utilization efficiency of the radio transmission bandwidth and the deterioration of the transmission efficiency of the communication system. Here, the deterioration of the utilization efficiency might be caused by the exhaustion of the buffer and the deterioration of the transmission efficiency might be caused by a retransmission control due to the deletion of packets by a buffer overflow.

By using this scheme, the amount of data flow from the control station to the base station can be controlled according to the amount of packets stored in the buffer, so that a buffer overflow in the base station can be avoided.

BRIEF SUMMARY OF THE INVENTION

However, the above-described conventional technologies relate to a data flow amount control in a case where a base station and a mobile station are performing a communication with each other through a radio section. Such technologies, however, does not refer to a data flow amount control in a case where a base station and a mobile station, newly, starts a communication with each other through a radio section.

In the conventional technologies, the data flow amount control is performed according to an amount of packets stored in a buffer of a base station, and a radio quality of a radio section between a base station and a mobile station.

However, in a case where a base station and a mobile station newly start a communication with each other through a radio section, there is no information available on the amount of packets stored in a buffer of the base station and information available on the radio quality of the radio section between the base station and the mobile station. Therefore, the conventional technologies are not applicable to the above problem.

For example, as a data flow amount control method at the moment when a base station and a mobile station newly start the communication with each other through a radio section, it can be considered to set an initial transmission rate in a wired section to a maximum reception rate at which the mobile station is capable of receiving a packet.

However, according to the above-described method, when there are a large number of mobile stations which are performing the communications with the base station, i.e. when the radio line is jammed, an excessive amount of packets are stored in the buffer of the base station, and, as a result, the deletion of packets caused by a buffer overflow may occur.

As described above, when using the conventional data flow amount control method in which data flows from the control station to the base station, there is a problem that the amount of the packets transmitted from the control station to the base station cannot be controlled at the moment when the base station and the mobile station newly start the communication with each other through the radio section.

Accordingly, in view of the above-described problem, an object of the present invention is to provide a data flow amount control device and a data flow amount control method in which an amount of packets transmitted from a control station to a base station is properly controlled at the moment when a base station and a mobile station newly start a communication with each other through a radio section.

To achieve the above-described object, a first aspect of the invention is summarized as a data flow amount control device in a mobile communication system which includes a plurality of mobile stations, a control station relaying packets addressed to each of the plurality of mobile stations, and a base station temporarily storing the packets transmitted from the control station in a buffer and transmitting the packets to each of the plurality of mobile stations, comprising: a determination unit configured to determine an initial value of an amount of packets which are addressed to a mobile station newly starting a communication in the mobile communication system and are transmitted from the control station to the base station, according to the number of mobile stations which are performing the communication in the mobile communication system.

In the first aspect of the present invention, the determination unit may be configured to determine the initial value according to the number of the mobile stations and a maximum transmission rate at which the mobile station newly starting the communication is capable of receiving the packets.

In the first aspect of the present invention, the determination unit may be configured to determine the initial value according to the number of the mobile stations, the maximum transmission rate, and a predetermined factor.

In the first aspect of the present invention, the determination unit may be configured to determine the initial value Initial_CA, according to an equation, Initial_CA=A× MAX_rate/Number, by using the number of the mobile stations Number, the maximum transmission rate MAX_rate, and the predetermined factor A.

A second aspect of the invention is summarized as a data flow amount control device in a mobile communication system which includes a plurality of mobile stations, a control station relaying packets addressed to each of the plurality of mobile stations, and a base station temporarily storing the packets transmitted from the control station in a buffer and transmitting the packets to each of the plurality of mobile stations, comprising: a determination unit configured to determine, when the base station is performing a communication with each of the plurality of mobile stations via a shared channel, an initial value of an amount of packets which are addressed to a mobile station newly starting a communication in the mobile communication system and are transmitted from the control station to the base station, according to an allocation frequency of the shared channel to each of the plurality of mobile stations which are performing the communication in the mobile communication system.

In the second aspect of the present invention, the determination unit may be configured to determine the initial value according to the allocation frequency of the shared channel, and a maximum transmission rate at which the mobile station newly starting the communication is capable of receiving the packets.

In the second aspect of the present invention, the determination unit may be configured to determine the initial value according to the allocation frequency of the shared channel, the maximum transmission rate, and a predetermined factor.

In the second aspect of the present invention, the determination unit may be configured to determine the initial value Initial_CA, according to an equation, Initial_CA=A× MAX_rate×Freq, by using an average value Freq of the allocation frequency of the shared channel, the maximum transmission rate MAX_rate, and the predetermined factor A.

In the second aspect of the present invention, the mobile station newly starting the communication may be a mobile station newly starting a communication with the base station due to a cell change.

A third aspect of the invention is summarized as a data flow amount control method in a mobile communication system which includes a plurality of mobile stations, a control station relaying packets addressed to each of the plurality of mobile stations, and a base station temporarily storing the packets transmitted from the control station in a buffer and transmitting the packets to each of the plurality of mobile stations, comprising the step of; determining an initial value of an amount of packets which are addressed to a mobile station newly starting a communication in the mobile communication system and transmitted from the control station to the base station, according to the number of mobile stations which are performing the communication in the mobile communication system.

DETAILED DESCRIPTION OF THE INVENTION

Embodiment Mode for Carrying Out the Invention

Next, an embodiment of the present invention will be described with reference to the accompanying drawings. In the following description of the drawings, identical or similar constituents will be denoted by identical or similar reference numerals. It is to be noted, however, that the drawings are merely exemplified.

(Configuration of Mobile Communication System)

An embodiment in which the invention is applied to a mobile communication system employing an HSDPA scheme in 3GPP is described in detail with reference to the accompanying drawings.

FIG. 1 shows a configuration of a mobile communication system to which an HSDPA scheme in 3GPP is applied. In the above described mobile communication system, a core network 40 including an exchange, control stations 30, 31, and base stations 20 to 24 are configured in hierarchically.

Mobile stations 10 to 12 perform communications with the base stations 20, 21 via radio channels. The control station 30 is a controller which controls the base stations 20 to 22 and the mobile stations 10, 11, and the control station 31 is a controller which controls the base stations 23, 24 and the mobile station 12.

It should be noted that the configuration of the mobile communication system shown in FIG. 1 is merely an example; and the numbers of the control stations, base stations, and mobile stations, and connection configurations are not limited to these described above.

Figure 2:
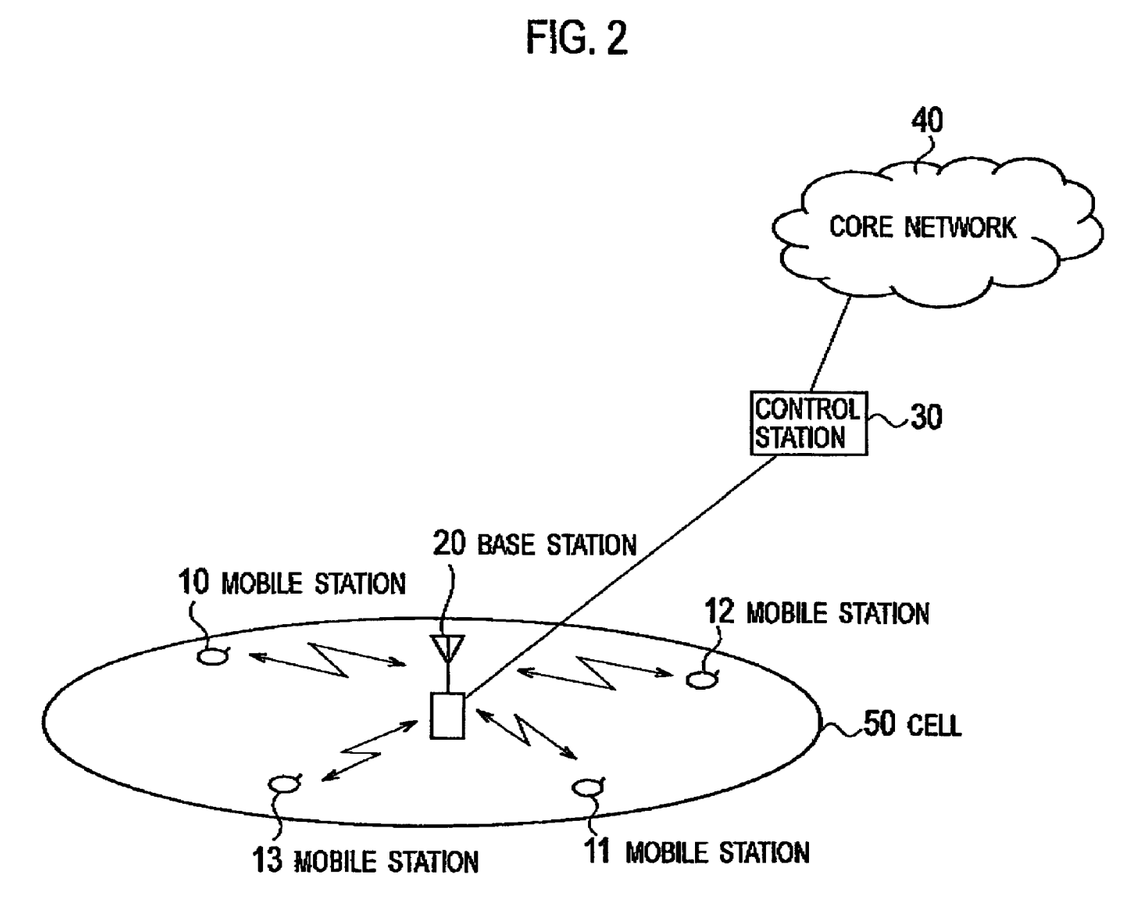
FIG. 2 is a simplified configuration example of the mobile communication system in FIG. 1.

An embodiment to which the invention is applied can be described using a core network, a single control station, a single base station controlled by the control station, a plurality of mobile stations which are performing communications with the base station through radio channels, a single mobile station newly starting a communication with the base station. Accordingly, FIG. 2 shows a simplified configuration example of the mobile communication system in FIG. 1.

In the following description, in mobile communication systems, the indexes of mobile stations, which are performing communications, are denoted by n (0, 1, 2, 3, . . . ). The mobile stations n (0, 1, 2, 3, . . . ) is performing communications with a base station 20 via radio channels. In addition, in above-described mobile communication systems, the Index of a mobile station, newly starting a communication, is denoted by A.

In the following description, on a mobile station newly starting a communication, a data flow amount control method, and an example of a data flow amount control device are described using a mobile station A. The mobile station A is assumed to start the communication with the base station 20 via a radio channel.

Here, a priority queue of a mobile station n in a base station is denoted by same index as the mobile station. In other words, a priority queue of the mobile station n in the base station is denoted by a priority queue n. This assumes that one priority queue exists for each mobile station. In addition, in the following description, although it is assumed that one priority queue exists for each mobile station, a plurality of priority queues may exist for each mobile station. In that case, for example, a priority queue n of a mobile station n is denoted by priority queues n, k (k is an Index of a priority queue).

Here, the priority queue is a data queue for buffering packets addressed to the above described mobile station n in the base station.

Figure 3:
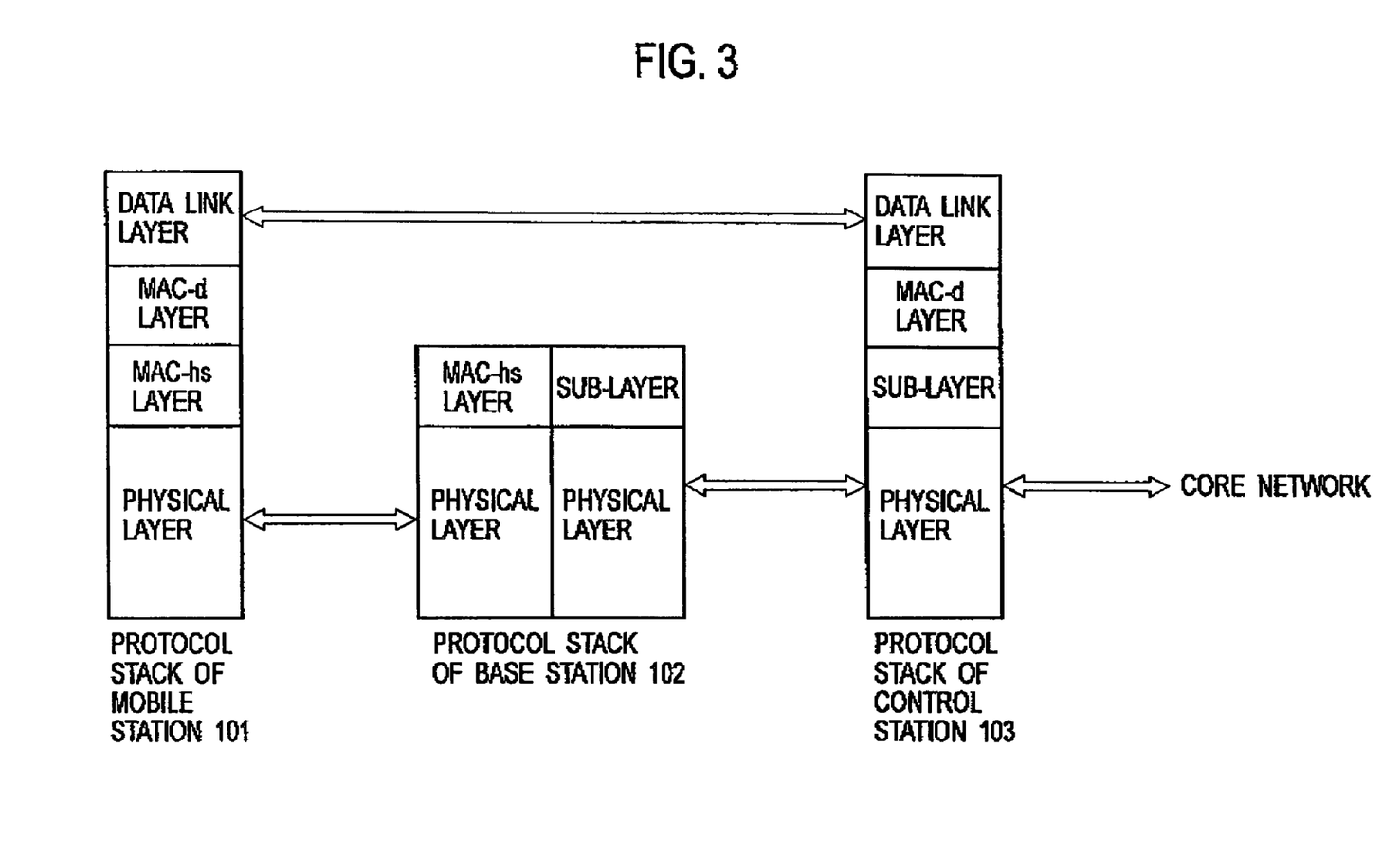
FIG. 3 is a figure showing protocol stacks of the mobile communication system of the present embodiment.

FIG. 3 shows protocol stacks of the mobile communication system shown in FIG. 1 and FIG. 2. A protocol stack 101 shows a protocol stack of a mobile station, and includes a physical layer and a MAC-hs layer which are opposite to a base station, and a MAC-d layer and a data link layer which are opposite to a control station.

A protocol stack 102 shows a protocol stack of the base station, and includes a physical layer and a MAC-hs layer which are opposite to the mobile station, and a physical layer and a sub-layer which are opposite to the control station.

A protocol stack 103 shows a protocol stack of the control station, and includes a physical layer and a sub-layer which are opposite to the base station, and a MAC-d layer and a data link layer which are opposite to the mobile station. In addition, on the protocol stack 103, a layer opposite to a core network also exists.

Figure 4:
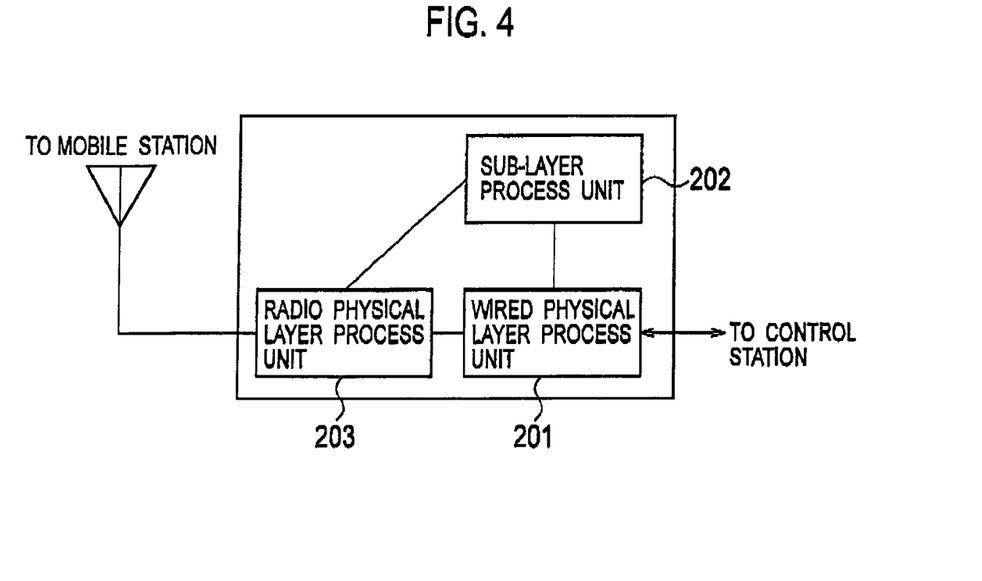
FIG. 4 is a functional block diagram of a base station of the present embodiment.

FIG. 4 shows a functional block diagram showing an example of a configuration of the base stations 20 to 24 shown in FIG. 1. As above described, the mobile stations are denoted by index n (0, 1, 2, . . . ).

As shown in FIG. 4, the base station includes a wired physical layer process unit 201, a sub-layer process unit 202, and a radio physical layer process unit 203. It should be noted that, in FIG. 4, only part related to the data flow amount control method of the present invention is described.

The wired physical layer process unit 201 is connected to the control station, the sub-layer process unit 202, and the radio physical layer process unit 203, and receives downlink packets from the control station, and transmits the packets to the radio physical layer process unit 203.

The sub-layer process unit 202 is connected to the wired physical layer process unit 201 and the radio physical layer process unit 203. The sub-layer process unit 202 performs communications with the control station on the control information.

In general, the sub-layer process unit 202 generates transmission amount control information controlling an amount of packets transmitted from a control station to a base station, the transmission amount control information relating to priority queues of respective mobile stations 0, 1, 2, . . . which are performing communications in a mobile transmission system.

Further, sub-layer process unit 202 transmits the transmission amount control information to the control station through the wired physical layer process unit 201.

Here, the transmission amount control information is, in the HSDPA scheme, referred to as Capacity Allocation or HS-DSCH CAPACITY ALLOCATION (HS-DSCH CAPACITY ALLOCATION Control Frame).

Moreover, in this embodiment, the sub-layer process unit 202 receives new transmission amount control information from a new data transmission amount control information calculation unit 2034 that is described later. Here, the new transmission amount control information is used for determining an initial value of an amount of packets which are addressed to the mobile station A newly starting the communication and are transmitted from the control station to the base station.

Further, the sub-layer process unit 202 transmits the received new transmission amount control information to the control station. Here, in the HSDPA schema, the new transmission amount control information is referred to as HS-DSCH Initial Capacity Allocation.

The radio physical layer process unit 203 is connected to the sub-layer process unit 202 and the wired physical layer process unit 201. Further, the radio physical layer process unit 203 performs a buffering process in which downlink packets received from the wired physical layer process unit 201 are buffered, a scheduling process for selecting a mobile station for allocating a shared channel (HS-DSCH) in the TTI, and transmission processes of a shared channel (HS-PDSCH as a physical channel) for the above described mobile station.

Here, the transmission processes of the selected shared channel represent, for example, a channel coding process, a spreading process, a frequency conversion process for converting into a radio frequency band, an amplification process, or the like. Although in the above described description, only the processes in the downlink of the present invention have been described, it should be noted that the radio physical layer process unit 203 also performs demodulation/decoding processes and the like in an uplink.

The radio physical layer process unit 203 performs a data transmission amount control information calculation process for calculating transmission amount control information to control an amount of packets transmitted from the control station to the mobile station. In addition, the radio physical layer process unit 203 generates the new transmission amount control information. Here, the new transmission amount control information is used for determining the initial value of the amount of packets which are addressed to the mobile station A newly starting the communication and are transmitted from the control station to the base station. Further, the radio physical layer process unit 203 transmits the generated new transmission amount control information to the sub-layer process unit 202.

Figure 5:
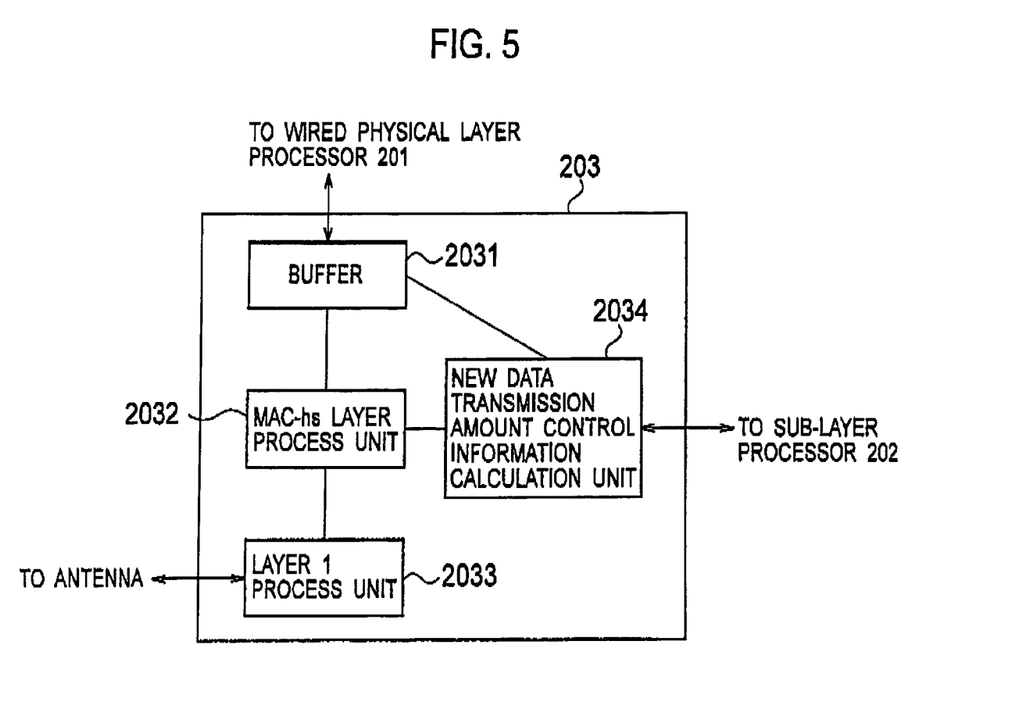
FIG. 5 is a functional block diagram showing details of a radio physical layer process unit of FIG. 4.

Next, a configuration of the radio physical layer process unit 203 is described in detail. FIG. 5 shows the configuration of the radio physical layer process unit 203. As shown in FIG. 5, the radio physical layer process unit 203 includes a buffer 2031, a MAC-hs layer process unit 2032, a layer 1 process unit 2033, and the new data transmission amount control information calculation unit 2034. Further, the above described configuration shows only elements extracted for the present invention, and those unnecessary for the present invention are omitted.

The buffer 2031 is connected to the wired physical layer process unit 201 and the MAC-hs layer process unit 2032.

The buffer 2031 performs buffering for temporarily storing packets which are received from the wired physical layer process unit 201 and which are transmitted from the control station to the base station. To be precise, the buffer 2031 performs buffering on packets for each priority queue n of each mobile station n.

Further, when there is a plurality of priority queues n, k of a mobile station n, buffering is performed on packets for each plurality of priority queues n, k of the above described mobile station n.

Further, the buffer 2031 acquires, from the MAC-hs layer process unit 2032, information on the mobile station to which the shared channel (HS-PDSCH) is allocated in the TTI and the priority queue of the mobile station, and on a data size of the shared channel. The buffer 2031, then, transmits, to the MAC-hs layer process unit 2032, packets stored in the priority queue of the mobile station which the shared channel is allocated in the TTI and transmitted in the TTI, i.e., the packets stored in the priority queue corresponding to the data size of the shared channel.

The MAC-hs layer process unit 2032 is connected to the layer 1 process unit 2033, the buffer 2031, and the new data transmission amount control information calculation unit 2034.

The MAC-hs layer process unit 2032 performs a scheduling process for selecting a mobile station for allocating a shared channel (HS-PDSCH) in the TTI and a priority queue for the selected mobile station. In other words, a priority queue for transmitting packets in the TTI is selected from among all priority queues.

In this case, the base station transmits the shared channel (HS-PDSCH as a physical channel, HS-DSCH as a transport channel, in the case of HSDPA) in the TTI to a mobile station corresponding to the selected priority queue. Further, as algorithms for the above described scheduling process, there are, for example, Round robin, Proportional Fairness, MAX C/I, and the like.

Subsequently, the MAC-hs layer process unit 2032 receives downlink radio quality information from the layer 1 process unit 2033. Then the MAC-hs layer process unit 2032 determines a transmission format of the shared channel in the TTI according to radio quality information of a mobile station corresponding to a priority queue selected for allocating the shared channel in the TTI and a radio resource available in the TTI.

The MAC-hs layer process unit 2032 notifies the buffer 2031 of information on the selected mobile station to which the shared channel is allocated in the TTI and the priority queue for the selected mobile station, and on a data size in the transmission format of the shared channel.

Here, the above described radio quality information denotes a Channel quality indicator (CQI) in HSDPA. Alternatively, as the radio quality information, for example, CPICH Ec/NO or CPICH RSCP other than the CQI may be used. Further, the radio resource available in the TTI denotes, for example, a code resource, a power resource, or a hardware resource. Still further, the transmission format of the shared channel in the TTI denotes, for example, a data size (transport block size), a modulation scheme, the number of codes of HS-PDSCH, transmission power of HS-PDSCH, or the like.

In addition, the MAC-hs layer process unit 2032 transmits to the layer 1 process unit 2033 information on the transmission format of the above described shared channel, and packets which are received from the buffer 2031 and are to be transmitted in the TTI.

Moreover, the MAC-hs layer process unit 2032 calculates an allocation frequency of a shared channel for each priority queue n of each mobile station n, that is, a transmission frequency $freq_n$ of packets.

The transmission frequency $freq_n$ of the packet in the TTI t can be calculated, for example, according to the following equation:

$$freq_n(t) = \tau \cdot freq_n(t-1) + (1-\tau) \cdot Allocated_n$$

by using $Allocated_n$ which is set a value of 1 when the shared channel is allocated to the priority queue n in the TTI t and is set a value of 0 when the shared channel is not allocated to the priority queue n in the TTI t and a forgetting factor $\tau$.

Here, $\tau$ denotes a factor for controlling the size of a measurement period on which the transmission frequency of the packets is measured; and, when $\tau$ is set closer to 1, the measurement period for the transmission frequency of the packets can be increased so that the data flow amount control can be performed under consideration of a longer time interval.

Further, the transmission frequency $freq_n$ of the packet in the TTI t is calculated, for example, according to the following equation:

$$freq_n(t) = \frac{\sum_{x=t-T_1}^{t} Allocated_n(x)}{T_1}$$

by using $Allocated_n(x)$ which is set a value of 1 when the shared channel is allocated to the priority queue n in the TTI x and is set a value of 0 when the shared channel is not allocated to the priority queue n in the TTI x, and an averaged period $T_1$.

Here, $T_1$ denotes a factor controlling the size of a measurement period on which the transmission frequency of the packets is measured; and, when $T_1$ is set to a large value, the measurement period for the transmission frequency of the packets can be increased so that the data flow amount control can be performed under consideration of a longer time interval.

Further, the MAC-hs layer process unit 2032 calculates a transmission rate $\overline{R}_n$ for each priority queue n of the each mobile station n, the transmission rate $\overline{R}_n$ being transmittable on a radio section.

The transmission rate $\overline{R}_n$ in the TTI for each priority queue n described above, which is transmittable on a radio section, is calculated, for example, according to the following equation:

$$\overline{R}_n(TTI) = \delta \cdot \overline{R}_n(TTI-1) + (1-\delta) \cdot r \quad (0 \leq \delta \leq 1)$$

Here, r denotes an instantaneous transmission rate which is calculated by using radio quality information (CQI) of a mobile station n and an available radio resource. Further, $\overline{R}_n(TTI)$ denotes a transmission rate transmittable on a radio section for each priority queue n in the TTI, and $\overline{R}_n(TTI-1)$ denotes a transmission rate transmittable on a radio section for each priority queue n in a previous TTI by one.

Further, δ denotes a forgetting factor for averaging. Controlling the value of δ enables a control of an averaged period for calculating an average transmission rate $\overline{R}_n$ transmittable on a radio section for each priority queue n. For example, when the value of δ is set closer to 1 a transmission rate transmittable on a radio section can be calculated by using a long average period, and when the value of δ is set to 0, an instantaneous value of a transmission rate transmittable on a radio section can be calculated.

For example, the above described r denotes a data size which is assumed to be transmittable with a predetermined error rate based on the radio quality information (CQI), transmission power capable of being allocated to a shared channel HS-PDSCH, and the number of codes capable of being allocated to a shared channel HS-PDSCH. For example, when the predetermined error rate is set to 10%, an error rate, at a time when the base station transmits packets having a data size corresponding to the transmission rate r to the mobile station n in the TTI, becomes approximately 10%.

Further, the transmission rate $\overline{R}_n$ transmittable on the radio section for each priority queue n described above is calculated under the assumption that a shared channel is allocated to a mobile station n on all TTIs without considering the allocation frequency of a shared channel. In other words, the average transmission rate $\overline{R}_n$ transmittable on the above described radio section is a value corresponding to a radio condition or a radio quality in a downlink between the base station and the mobile station n.

The MAC-hs layer process unit 2032 transmits, to the new data transmission amount control information calculation unit 2034, the allocation frequency of the shared channel, i.e., the transmission frequency $freq_n$ of packets, for each priority queue n of the each mobile station n, and a transmission rate $\overline{R}_n$ transmittable on a radio section for each priority queue n of each mobile station n.

The layer 1 process unit 2033 is connected to the MAC-hs layer process unit 2032, and an antenna.

The layer 1 process unit 2033 receives, from the MAC-hs layer process unit 2032, information on a transmission format of a shared channel to be transmitted in the TTI, and packets to be mapped to the shared channel. Then the layer 1 process unit 2033 performs a transmission process on the shared channel to be transmitted to a radio section in the TTI, based on the information on the transmission format.

To be more precise, the layer 1 process unit 2033 performs a turbo coding for packets to be mapped to the shared channel, a spreading process, a frequency conversion process for converting into a radio frequency band, an amplification process, and the like. Further, after performing the above described transmission process, a signal of the shared channel is transmitted to the radio section through the antenna.

The layer 1 process unit 2033 includes a function of receiving downlink radio quality information (CQI), which is mapped to an uplink control channel (HS-DPCCH) and transmitted from the each mobile station n, and a function of demodulating/decoding the same. The downlink radio quality information of the each mobile station n is transmitted to the MAC-hs layer process unit 2032. In addition, the layer 1 process unit 2033 has functions of receiving acknowledgement confirmation information (ACK/NACK) of a downlink shared channel, which is mapped to an uplink control channel (HS-DPCCH) and transmitted from each mobile station n, and a function of demodulating/decoding the same. The acknowledgement confirmation information of a downlink shared channel is transmitted to the MAC-hs layer process unit 2032.

The new data transmission amount control information calculation unit 2034 is connected to the MAC-hs layer process unit 2032, and the sub-layer process unit 202.

The new data transmission amount control information calculation unit 2034 receives the allocation frequency of a shared channel, i.e. the transmission frequency $freq_n$ of packets, for each priority queue n of each mobile station n from the MAC-hs layer process unit 2032, and also receives the transmission rate $\overline{R}_n$ transmittable on the radio section for each priority queue n of each mobile station n.

The new data transmission amount control information calculation unit 2034 calculates new transmission amount control information, i.e. Initial_CA. The new transmission amount control information Initial_CA is used for determining the initial value of the amount of packets which are addressed to the mobile station A newly starting the communication and are transmitted from the control station to the base station.

For example, when MAX_rate denotes the maximum reception rate at which the mobile station A is capable of receiving the packets, the new data transmission amount control information calculation unit 2034 may calculate the new transmission amount control information according to the following equation, $$Initial\_CA = MAX\_rate \times Freq,$$

where $$Freq = \frac{\sum_n freq_n}{\sum_n 1}.$$

Freq denotes an allocation frequency of the shared channel for each priority queue n of each mobile station n, i.e. an average value acquired by averaging the transmission frequencies of packets among mobile stations, but may also be an instantaneous value, or an average value acquired by averaging the transmission frequency of packets during a predetermined period.

Further, the new data transmission amount control information calculation unit 2034 may calculate the new transmission amount control information according to the following equation, $$\text{Initial\_}CA = MAX\_\text{rate} \times \text{Freq} \times \alpha.$$

Here, α denotes arbitrary factor. For example, α can be set to a value such as 0.8, 1.0 or 1.2. The use of the factor α makes it possible to set a large value or a small value as an initial value of the data transmission amount.

Further, the above described Freq may be calculated for each service type and each agreement type of packets stored in the priority queue n of the each mobile station, each type of agreement, each type of receiver (RAKE receiver, equalizer, reception diversity, interference canceller, other Capability of the mobile station n(denotes classified depending on receivable demodulation scheme, the number of receivable codes, the number of receivable bits, and the like) and the like), and each type of priority class.
For example, when there are two priority classes, Freq is calculated for each priority class, the Freq being calculated by using the mobile stations belonging to each priority class as a population.

Further, the above-described a may be provided for each type of service and each type of agreement of packets stored in the priority queue n of the each mobile station n, each type of receiver (a RAKE receiver, an equalizer, a reception diversity, an interference canceller, Capability of another mobile station n (denotes classified according to receivable demodulation scheme, the number of receivable codes, the number of receivable bits), and the like), and each type of priority class.

For example, the service type denotes a type of service in which downlink packets are transmitted, and, for example, includes a VoIP service, a voice service, a streaming serving, an FTP service, and the like.

The agreement type denotes a type of agreement subscribed by a user of a mobile station to which downlink packets are transmitted, and, for example, includes a Low Class agreement, a High Class agreement, and the like.

Further, the terminal type is used to classify a capability of the mobile station to which downlink packets are transmitted, and include a class based on identification information of mobile station, the presence/absence or the type of such as a RAKE reception function, a receive diversity, an equalizer, an interference canceller, and a capability of the mobile station such as a receivable modulation scheme, the number of receivable codes, and the number of receivable bits.

Further, a priority class denotes the degree of priority for the transmission of downlink packets. For example, downlink packets of first priority are transmitted prior to downlink packets of second priority.

Further, for example, the new data transmission amount control information calculation unit 2034 may calculate the new data transmission amount control information according to the following equation, $$\text{Initial\_}CA = MAX\_\text{rate} \times \alpha / \text{Number}.$$

Here, Number in the above-described equation denotes the number of mobile stations which are performing the communications with the base station 20 via radio channels. The number of mobile stations may be the number of mobile stations which are performing the communications with the base station 20 as a Serving cell, or may be the number of mobile stations which are performing the communications with the base station 20 as a Serving cell and in which packets to the mobile stations are stored in the priority queues of the buffer 2031.

In addition, for example, the new data transmission amount control information calculation unit 2034 may calculate the new transmission amount control information according to the following equation, $$\text{Initial\_}CA = \text{Cell\_throughput} \times \text{Freq} \times \alpha.$$

Here Cell_throughput in the above-described equation denotes throughput acquired by adding throughput of the mobile station n. The Cell_throughput described above may be throughput of the MAC-hs layer, or may be throughput of the TCP layer. For example, the throughput of the MAC-hs layer for the mobile station n denotes the size of packets having received ACK as acknowledgement confirmation information, among packets which are transmitted to the mobile station n in one second by using the shared channel.

Further, the new data transmission amount control information calculation unit 2034 may calculate the new transmission amount control information according to the following equation, $$\text{Initial\_}CA = \text{Cell\_throughput} \times \alpha / \text{Number}.$$

In the above-described example, Cell_throughput is a real transmission rate used in communication, i.e. throughput. Alternatively, Cell_throughput may be an average value acquired by averaging transmission rates $\overline{R}_n$ among users the transmission rate $\overline{R}_n$ being transmittable on the radio section for the mobile station n. That is, $$\text{Cell\_throughput} = \frac{\sum_n \overline{R}_n}{\sum_n 1}$$

Still further, the new data transmission amount control information calculation unit 2034 transmits, to the sub-layer process unit 202, the new transmission amount control information, i.e. Initial_CA The new transmission amount control information Initial_CA is used for determining the initial value of the amount of packets which are addressed to the mobile station A newly starting the communication and are transmitted from the control station to the base station.

Here, when the new transmission amount control information Initial_CA is calculated as an amount of packets transmitted in one second, i.e. a transmission rate, the new data transmission amount control information calculation unit 2034 may transmit Maximum MAC-d PDU Size and HS-DSCH Initial Widow Size that are information elements of the HS-DSCH Initial Capacity Allocation as the new transmission amount control information Initial_CA.

Alternatively, when the new transmission amount control information Initial_CA is calculated as an amount of packets transmitted in one second, i.e. a transmission rate, the new data transmission amount control information calculation unit 2034 may transmit a MAC-d PDU Size, the number of the MAC-d PDU Size (the number of Credits), and an Interval (the interval at which the MAC-d PDU) as the new transmission amount control information Initial_CA.

Figure 6:
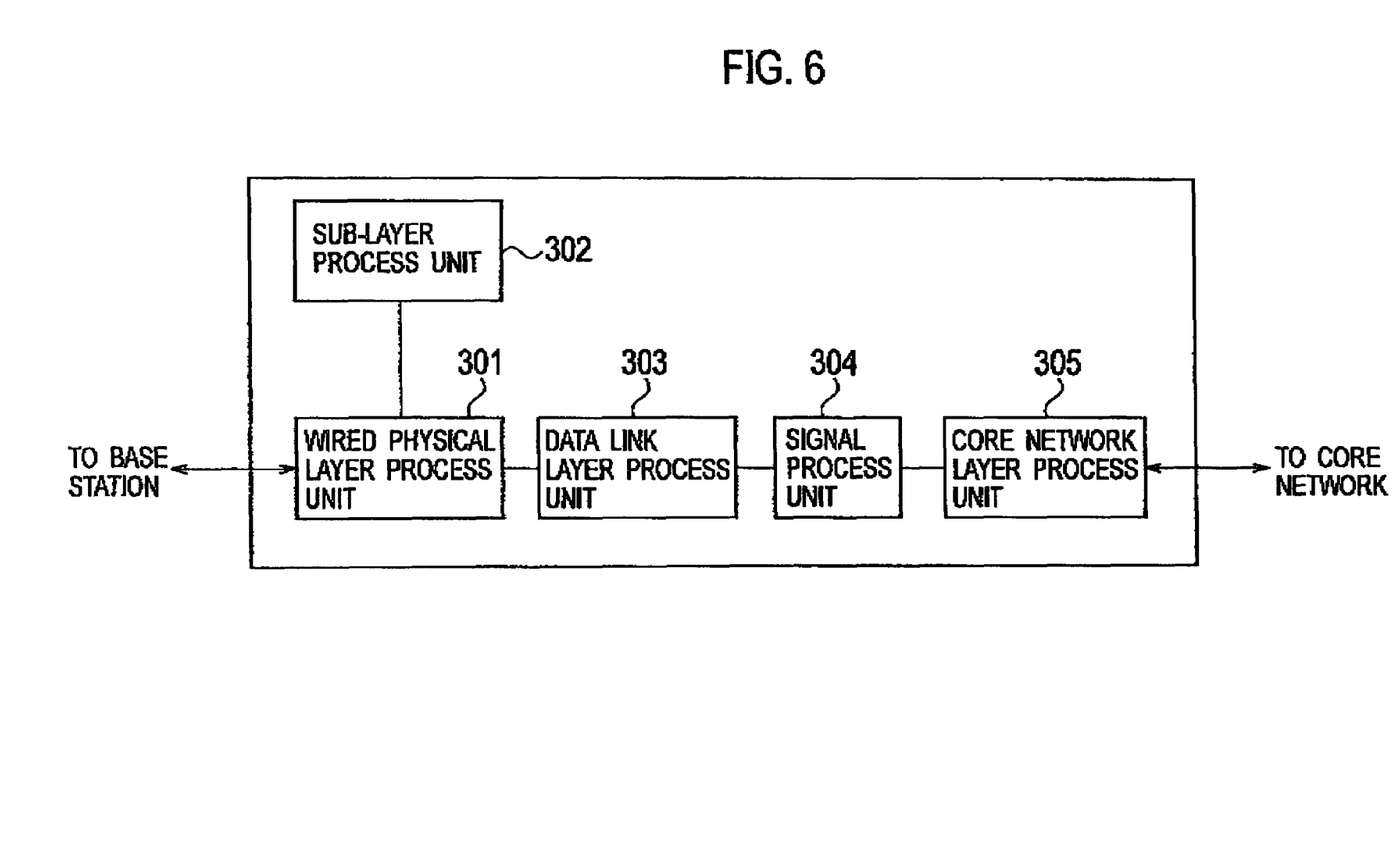
FIG. 6 is a functional block diagram of a control station of the present embodiment.

FIG. 6 shows a functional block diagram showing an example of a configuration of the control stations 30, 31 shown in FIG. 1.

As shown in FIG. 6, the control station includes a wired physical layer process unit 301 performing communications with a base station, a sub-layer process unit 302 performing communications with a base station on control information, a data link layer process unit 303 performing communications with a mobile station, a signal process unit 304 performing a signal relaying process between a mobile station and a core network, buffering, and the like, and a core network layer process unit 305 performing communications with a core network.

The wired physical layer process unit 301 performs communication with a base station, and is connected to a base station through a wired link in the present embodiment.

The sub-layer process unit 302 performs communications with a base station on control information.

In general the sub-layer process unit 302 processes transmission amount control information for controlling the amount of packets transmitted from a control station to a base station, the information being notified by the sub-layer process unit 202 in a base station and being for a priority queue n of each mobile station n.

To be more precise, the sub-layer process unit 302 receives the transmission amount control information notified by the sub-layer process unit 202, i.e., information (Capacity Allocation) showing a transmission rate at a time when packets addressed to a mobile station n are transmitted from the control station to the base station. Then the sub-layer process unit 302 controls a transmission rate of the packets transmitted from the control station to the base station i.e., a data transmission rate, based on the received information (Capacity Allocation).

Moreover, in this embodiment, the sub-layer process unit 302 (a determination unit) processes the new transmission amount control information, and thereby determines an initial value of an amount of packets which are addressed to the mobile station newly starting the communication and are transmitted from the control station to the base station.

More specifically, the sub-layer process unit 302 receives the HS-DSCH Initial Capacity Allocation for the mobile station A, and thereby controls an initial transmission rate of packets transmitted from the control station to the base station. For example, the sub-layer process unit 302 controls the initial transmission rate of packets transmitted from the control station to the base station, according to the Maximum MAC-d PDU Size and HS-DSCH Initial Widow Size in the HS-DSCH Initial Capacity Allocation.

The data link layer process unit 303 performs communications with a mobile station n. The signal process unit 304 performs relaying processes on data such as voice signals and packets transmitted/received between a mobile station n and a core network. The core network layer process unit 305 establishes communication with a core network.

(Data Flow Amount Control Method)

Figure 7:
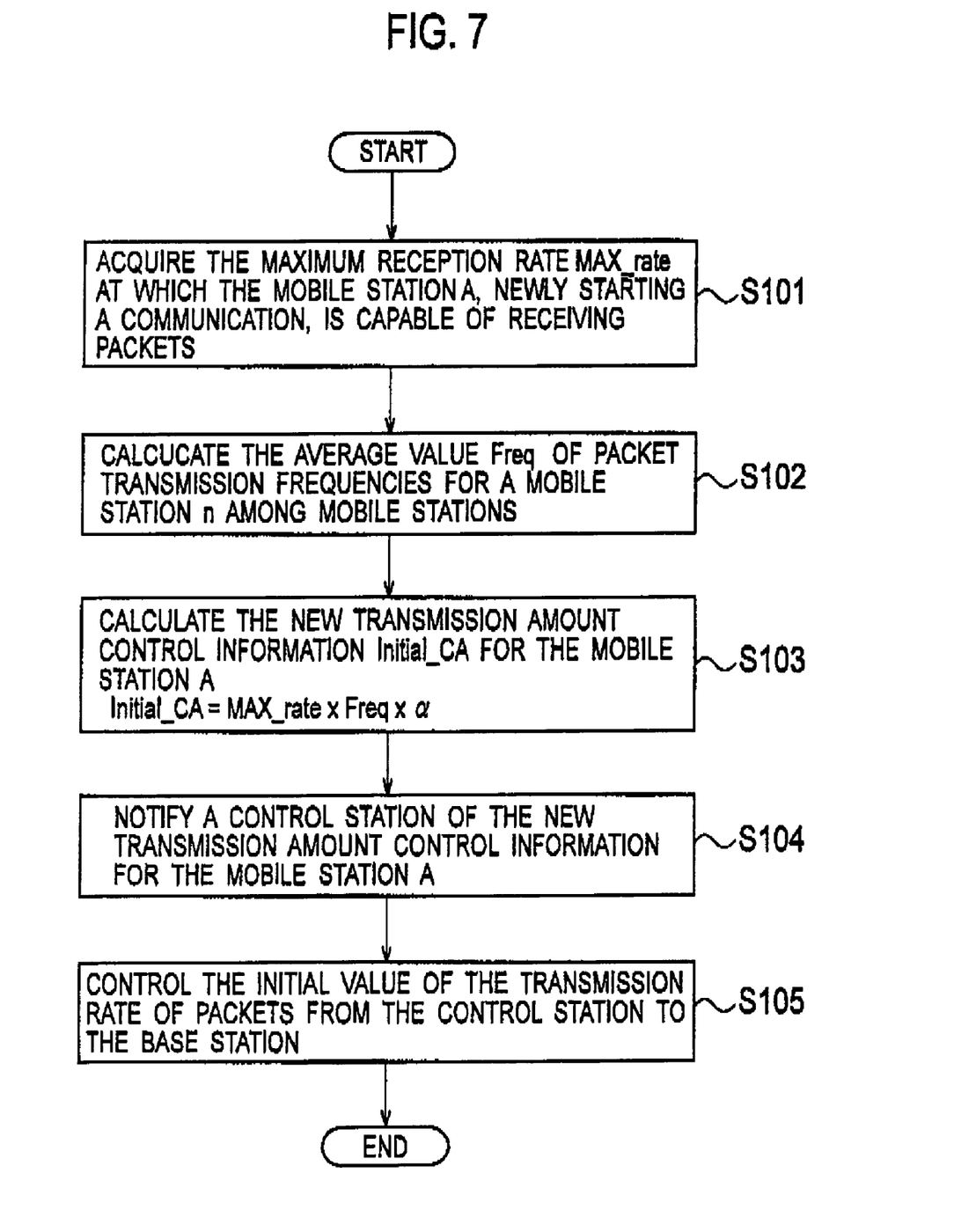
FIG. 7 is a flowchart showing a data flow amount control of the present embodiment.

Next, operation of a data flow amount control method according to the invention is described with reference to a flowchart shown in FIG. 7.

In Step S101, the new data transmission amount control information calculation unit 2034 of the radio physical layer process unit 203 acquires the maximum reception rate MAX_rate at which the mobile station A newly starting a communication is capable of receiving packets.

In Step S102, the new data transmission amount control information calculation unit 2034 of the radio physical layer process unit 203 calculates the allocation frequency of the shared channel for each priority queue n of each mobile station n, i.e., the value Freq acquired by averaging the transmission frequencies of the packets among mobile stations, according to the following equation, $$Freq = \frac{\sum_n freq_n}{\sum_n 1}.$$

In Step S103, the new data transmission amount control information calculation unit 2034 of the radio physical layer process unit 203 calculates the new transmission amount control information Initial_CA for the mobile station A according to the following equation, $$Initial\_CA = MAX\_rate \times Freq \times \alpha.$$

In Step S104, the sub-layer process unit 202 of the base station notifies a control station of the new transmission amount control information (HS-DSCH Initial Capacity Allocation) for the mobile station A in order to control an initial value of an amount of packets which are addressed to the mobile station newly starting the communication and are transmitted from the control station to the base station.

In Step S105, the sub-layer process unit 302 of the control station controls the initial value of the transmission rate of the packets according to the new transmission amount control information (HS-DSCH Initial Capacity Allocation) for controlling the initial value of the amount of the packets which are addressed to the mobile station newly starting the communication and are transmitted from the control station to the base station.

In the above-described example, in Step S101, the maximum reception rate MAX_rate at which the mobile station A newly starting to the communication is capable of receiving packets is acquired, and, in Step S103, the new transmission amount control information for the mobile station A is calculated by using the acquired maximum reception rate MAX_rate.

Alternatively, in Step S101, a Cell_throughput is calculated, and in Step S103, the new transmission amount control information for the mobile station A may be calculated by using the calculated Cell_throughput instead of the maximum reception rate MAX_rate.

Here, the Cell_throughput is throughput acquired by adding user throughput of the mobile station n. The Cell_throughput may be throughput of the MAC-hs layer, or may be throughput of the TCP layer. For example, the throughput of the MAC-hs layer for the mobile station n denotes the size of packets having received ACK as acknowledgement confirmation information, among packets which are transmitted to the mobile station n in one second by using a shared channel.

Alternatively, Cell_throughput may be an average value acquired by averaging transmission rates $\overline{R}_n$ among users, the transmission rate $\overline{R}_n$ being transmittable on the radio section for the mobile station n, instead of the actual transmission rate, i.e. throughput. That is, $$Cell\_throughput = \frac{\sum_n \overline{R}_n}{\sum_n 1}$$

Further, in the above-described example, in Step S102, the value Freq acquired by averaging the transmission frequencies of the packets among mobile stations is calculated, and the new transmission amount control information for the mobile station A is calculated by using the calculated value Freq.

Alternatively, in Step S101, the Number is calculated, and in Step 103, the new transmission amount control information for the mobile station A may be calculated by using 1/Number instead of the value Freq.

Here, the Number denotes the number of mobile stations which are performing communications with the base station 20 via radio channels. Here, the number of mobile stations, may be the number of mobile stations which are performing the communications with the base station 20 as a Serving cell, or may be the number of mobile stations which are performing the communications with the base station 20 as a Serving cell and in which packets addressed to the mobile stations are stored in the priority queues of the buffer 2031.

(Operation and Effect)

As described above, according to this embodiment of the invention, the initial value of the amount of the packets which are addressed to the mobile station A newly starting the communication and are transmitted from the control station to the base station can be adequately determined. Further, at the start of the communication, the amount of the packets which are addressed to the mobile station A newly starting the communication and are transmitted from the control station to the base station can be adequately controlled.

Consequently it becomes possible to prevent the deterioration of utilization efficiency of a radio bandwidth, which is caused by the exhaustion of the buffer, and the deterioration of transmission efficiency of a system, which caused by a retransmission control due to the deletion of packets by a buffer overflow.

For example, the Freq and 1/Number each are a predicted value of the allocation frequency of the shared channel on assumption that the mobile station A performs communication. It is possible to properly determine the initial value of the amount of the packets transmitted from the control station to the base station, by a multiplication of the predicted value Freq and 1/Number with a maximum reception rate at which the mobile station A is capable of receiving the packets.

Alternatively, the Cell_throughput is a sum of user throughput of mobile stations which are performing communication with the base station. It is possible to properly determine the initial value of the amount of the packets transmitted from the control station to the base station, by a multiplication of the Cell_throughput with the Freq or with the 1/Number.

OTHER EMBODIMENT

Although the present invention is described using the embodiment described above, it is to be understood that the invention is not to be considered limited to what is in the description and the drawings, which constitutes part of this disclosure. Because of this disclosure, variations or modifications of the embodiments described above are obvious to those skilled in the art.

For example, the MAC-hs layer process unit 2032 and the new data transmission amount control information calculation unit 2034 of the radio physical layer process unit 203 may be configured of, for example, a CPU, a digital signal process unit (DSP), or with a programmable device in which a program is capable of being rewritten such as a FPGA, and further may be configured so that an evaluation function program is stored in a predetermined memory area and parameters (δ, τ, α) are downloaded for rewriting. At this time, the above parameters (δ, τ, α) may be downloaded from an upper node of a base station, or may be directly read from terminals I/F (external interface function) which are provided to the MAC-hs layer process unit 2032 and the new data transmission amount control information calculation unit 2034.

Moreover, the aforementioned functional blocks of the wired physical layer process unit 203 may be divided as hardware in some case, or may be divided as software that is a program operated on a process unit in another case.

Further, in the embodiments described above, although a high speed packet transmission scheme HSDPA in 3GPP is described, the present invention is not limited to the HSDPA, and is applicable to another high speed packet transmission scheme which performs a data flow amount control (flow control) of downlink packets in a mobile communication system. For example, cdma2000 1xEV-DO in 3GPP2, a TDD scheme in 3GPP, a high speed packet transmission scheme in Long Term Evolution (Super 3G), or the like is referred as another high speed packet transmission scheme.

Further, while the above-described embodiments have been described using the control station as the data flow amount control device, the data flow amount control device may be a base station, or may be a higher device than the control station.

Still further, in the above-described embodiments, the expression "newly starting a communication" may denote the case where a mobile station actually starts a communication, or may denote the case where a mobile station newly starts a communication with the base station due to a cell change (handover).

As described above, it is certain that the present invention includes variations and modifications of the embodiments which are not described in this specification. Accordingly, the scope of the present invention is defined by the appended claims rather than by the foregoing description.

What is claimed is:

1. A data flow amount control device in a mobile communication system employing a high-speed downlink packet access (HSDPA) and which includes a plurality of mobile stations, a control station relaying packets addressed to each of the plurality of mobile stations, and a base station temporarily storing the packets transmitted from the control station in a buffer and transmitting the packets to each of the plurality of mobile stations, comprising:

a determination unit configured to determine an initial value of a HS-DSCH (High Speed Downlink Shared Channel) Initial Capacity Allocation, which is an amount of packets which are addressed to a mobile station newly starting a communication in the mobile communication system and are transmitted from the control station to the base station, in inverse proportion to a number of mobile stations which are performing communication with the base station in the mobile communication system, wherein the determination unit is configured to determine a lower initial value as the number of mobile stations performing communication increases, and to determine a higher initial value as an allocation frequency of a shared channel increases.

2. The data flow amount control device according to claim 1, wherein the determination unit is configured to determine the initial value according to the number of the mobile stations performing communication with the base station and a maximum transmission rate at which the mobile station newly starting the communication is configured to receive the packets.

3. The data flow amount control device according to claim 2, wherein the determination unit is configured to determine the initial value according to the number of the mobile stations performing communication with the base station, the maximum transmission rate, and a predetermined factor.

4. The data flow amount control device according to claim 3, wherein the determination unit is configured to determine the initial value Initial_CA, according to an equation, $$\text{Initial\_CA} = A \times \text{MAX\_rate}/\text{Number},$$

by using the number of the mobile stations performing communication with the base station (Number), the maximum transmission rate MAX_rate, and the predetermined factor A.

5. The data flow amount control device according to claim 1, wherein the mobile station newly starting the communication, is a mobile station newly starting a communication with the base station due to a cell change.

6. The data flow amount control device of claim 1, wherein the determination unit is configured to determine the initial value of the amount of packets which are addressed to the mobile station newly starting the communication when no information is available regarding an amount of packets stored in a buffer of the base station and no information is available on radio quality between the base station and the mobile station newly starting the communication.

7. The data flow amount control device of claim 1, further comprising:
   means for calculating the number of mobile stations that are performing communication with the base station as a serving cell and in which packets addressed to the mobile station are stored in a priority queue of a buffer of the base station.

8. The data flow amount control device of claim 1, wherein the determination unit is part of the base station.

9. The data flow amount control device of claim 1, further comprising:
   a notification unit configured to notify the control station of the determined initial value of the amount of packets.

10. A data flow amount control device in a mobile communication system employing a high-speed downlink packet access (HSDPA) and which includes a plurality of mobile stations, a control station relaying packets addressed to each of the plurality of mobile stations, and a base station temporarily storing the packets transmitted from the control station in a buffer and transmitting the packets to each of the plurality of mobile stations, comprising:
    a determination unit configured to determine, when the base station is performing a communication with each of the plurality of mobile stations via a shared channel, an initial value of a HS-DSCH (High Speed Downlink Shared Channel) Initial Capacity Allocation, which is an amount of packets which are addressed to a mobile station newly starting a communication in the mobile communication system and are transmitted from the control station to the base station, according to an average value of an allocation frequency of the shared channel to each of the plurality of mobile stations which are performing the communication with the base station in the mobile communication system.

11. The data flow amount control device according to claim 10, wherein the determination unit is configured to determine the initial value according to the average value of the allocation frequency of the shared channel, and a maximum transmission rate at which the mobile station newly starting the communication is configured to receive the packets.

12. The data flow amount control device according to claim 11, wherein the determination unit is configured to determine the initial value according to the average value of the allocation frequency of the shared channel, the maximum transmission rate, and a predetermined factor.

13. The data flow amount control device according to claim 12, wherein the determination unit is configured to determine the initial value Initial_CA, according to an equation, $$\text{Initial\_CA} = A \times \text{MAX\_rate} \times \text{Freq},$$

by using the average value (Freq) of the allocation frequency of the shared channel, the maximum transmission rate MAX_rate, and the predetermined factor A.

14. A data flow amount control method in a mobile communication system employing a high-speed downlink packet access (HSDPA) and which includes a plurality of mobile stations, a control station relaying packets addressed to each of the plurality of mobile stations, and a base station temporarily storing the packets transmitted from the control station in a buffer and transmitting the packets to each of the plurality of mobile stations, comprising the step of:
    determining, by the base station, an initial value of a HS-DSCH (High Speed Downlink Shared Channel) Initial Capacity Allocation, which is an amount of packets which are addressed to a mobile station newly starting a communication in the mobile communication system and transmitted from the control station to the base station, in inverse proportion to the number of mobile stations which are performing the communication with the base station in the mobile communication system, wherein the determining step comprises determining a lower initial value as the number of mobile stations performing communication increases, and determining a higher initial value as an allocation frequency of a shared channel increases.

* * * * *